United States Patent
Bohling et al.

(10) Patent No.: US 8,914,677 B2
(45) Date of Patent: Dec. 16, 2014

(54) MANAGING TRACES TO CAPTURE DATA FOR MEMORY REGIONS IN A MEMORY

(75) Inventors: Neal E. Bohling, Tucson, AZ (US); Joseph V. Malinowski, Tucson, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 13/535,338

(22) Filed: Jun. 27, 2012

(65) Prior Publication Data

US 2014/0006874 A1  Jan. 2, 2014

(51) Int. Cl.
*G06F 11/00* (2006.01)

(52) U.S. Cl.
USPC .......................................................... 714/35

(58) Field of Classification Search
CPC  G06F 11/3636; G06F 11/3466; G06F 11/348
See application file for complete search history.

(56) References Cited

U.S. PATENT DOCUMENTS

| | | | |
|---|---|---|---|
| 2006/0184833 A1* | 8/2006 | Al-Omari et al. | 714/45 |
| 2007/0074048 A1 | 3/2007 | Rudelic et al. | |
| 2007/0226544 A1* | 9/2007 | Woodhouse | 714/45 |
| 2009/0106741 A1* | 4/2009 | Dageville et al. | 717/128 |
| 2010/0318746 A1 | 12/2010 | Troxel et al. | |
| 2011/0167198 A1 | 7/2011 | Soja et al. | |
| 2012/0017123 A1* | 1/2012 | Masser et al. | 714/45 |

* cited by examiner

*Primary Examiner* — Charles Ehne
(74) *Attorney, Agent, or Firm* — David W. Victor; Konard Raynes Davda & Victor

(57) ABSTRACT

Provided are a computer program product, system, and method for managing traces to capture data for memory regions in a memory. A trace includes a monitor parameter used by a trace procedure to monitor data in a memory device. A frequency is determined at which the trace procedure monitors the memory device. The trace procedure is invoked at the determined frequency to perform trace procedure operations comprising determining a region in the memory device according to the monitor parameter and copying data in the determined region to trace data in a data space.

25 Claims, 5 Drawing Sheets

MANAGING TRACES TO CAPTURE DATA FOR MEMORY REGIONS IN A MEMORY

BACKGROUND OF THE INVENTION

1. Field of the Invention

The present invention relates to a computer program product, system, and method for managing traces to capture data for memory regions in a memory.

2. Description of the Related Art

Errors may occur in a computational environment when multiple applications are writing to a commonly used memory space. The common memory areas may be overlaid with data by different applications, causing data integrity problems, hangs, system outages and other problems. In the current art, to analyze such errors, the user may set a slip or trap so that if any process changes a storage region being monitored, the data in the monitored region after the change is captured with a dump. This allows the person debugging the problem to analyze the data in the area that was dumped and determine the application that wrote the data resulting in the dump. Any change to the monitored area, including changes that are not producing errors, may cause the data to be dumped and require the trap to reset. Further, in the current art, only one slip may be set at a time.

There is a need in the art for improved techniques to monitor memory to debug errors.

SUMMARY

Provided are a computer program product, system, and method for managing traces to capture data for memory regions in a memory. A trace includes a monitor parameter used by a trace procedure to monitor data in a memory device. A frequency is determined at which the trace procedure monitors the memory device. The trace procedure is invoked at the determined frequency to perform trace procedure operations comprising determining a region in the memory device according to the monitor parameter and copying data in the determined region to trace data in a data space.

DETAILED DESCRIPTION

Described embodiments provide techniques for creating traces to monitor a memory space to periodically capture data in the memory space to use to debug and troubleshoot errors. With described embodiments, multiple traces may be set to concurrently operate and concurrently capture data for different monitored parameters, such as a monitored address range and a monitored access type. A monitored access type may capture data for a memory region accessed by the monitored access type, such as an access of a monitored block size or an access by a monitored application. The traces are set to periodically capture data for a monitored memory region and/or access type so that if an error occurs, the user may review the captured data from the memory that existed before and after the error.

Figure 1:
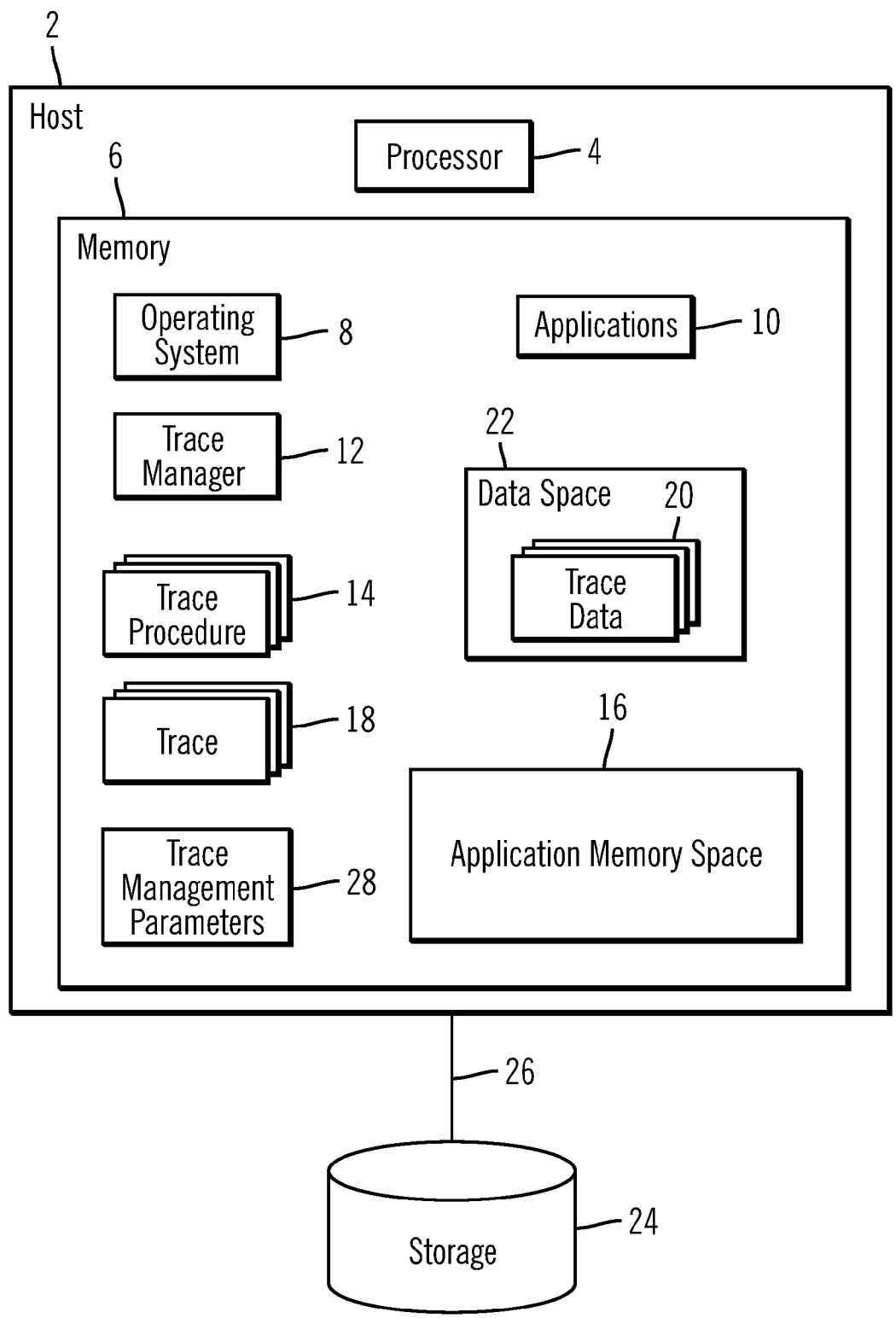
FIG. 1 illustrates an embodiment a computing environment.

FIG. 1 illustrates an embodiment of a computing environment. A host 2 includes a processor 4, which may comprise one or more processors and/or cores, and a memory 6 including programs, such as an operating system 8, an application 10, a trace manager 12 and one or more invoked trace procedures 14. The trace procedures 14 comprise processes or threads invoked to perform trace operations with respect to a region of an application memory space 16 according to a defined trace 18. There may be multiple defined traces 18 providing settings for monitoring a region of the application memory space 16, such that one trace procedure 14 is invoked to handle monitoring operations defined for one trace 18. In alternative embodiments, one trace procedure 14 may perform the monitoring operations for multiple defined traces 18. The application memory space 16 stores data from applications 10 in the host 2 and from applications remote with respect to the host 2, such as in different client or server systems that communicate with the host 2 over a network (not shown). The application memory space 16 may further store data used by the host operating system 8, such as system state information.

The trace procedure 14 captures data from the application memory space 16 according to a defined trace 18 and stores the captured data as trace data 20 in a data space 22. The data space 22 may be implemented in the memory 6 or in another storage device. The host 2 may use storage 24 to store application data in the application memory space 16 and to store trace data 20 from the data space 22.

The trace manager 12 may access trace management parameters 28 that define parameters used for the trace procedures 14, such as a frequency at which the trace procedures 14 scan the application memory space 16 to capture data comprising data in a region of the memory space 16 monitored by the trace 18 as of a point-in-time. In this way, the trace data 20 may store different versions of captured data in the region of the memory space 16 monitored by the trace 18.

In one embodiment, the memory device 6 may comprise one or more volatile or non-volatile storage devices, such as a Dynamic Random Access Memory (DRAM), Random Access Memory (RAM) or a non-volatile memory, e.g., battery backed-up Random Access Memory (RAM), static RAM (SRAM), solid state storage devices (SSDs), etc.

The host 2 may comprise a computational device known in the art, such as a workstation, mainframe, server, etc. The host 2 may communicate Input/Output (I/O) requests to a control unit for the storage 24, such as a storage subsystem or server, such as an enterprise storage server, storage controller, etc., or other device used to manage I/O requests to attached volumes. The storage 24 may comprise one or more storage devices known in the art, such as interconnected storage devices (e.g., configured as a DASD, RAID, JBOD, virtualized devices, etc.), as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The host 2 communicates with the storage 24 via a connection 26. The connection 26 may comprise a network such as a Local Area Network (LAN), Storage Area Network (SAN), Wide Area Network (WAN), peer-to-peer network, wireless network, etc. Alternatively, the connection 26 may comprise a bus interface, such as a Peripheral Component Interconnect (PCI) bus or serial interface. The operating system 8 may comprise suitable operating systems known in the art, such as the International Business Machines ("IBM®") z/OS® operating system. (IBM and z/OS are trademarks of IBM in the United States and foreign countries).

Programs and data loaded in the memory 6 may be stored in the storage 24 and loaded from the storage 24 into the memory 6 as needed.

The operating system 8 receives data requests from the applications 10. The applications 6 may include middleware, access methods, and independent software vendor (ISV) products. Data sets may hold critical data. The host 2 may also receive I/O requests from applications on systems over a network.

Figure 2:
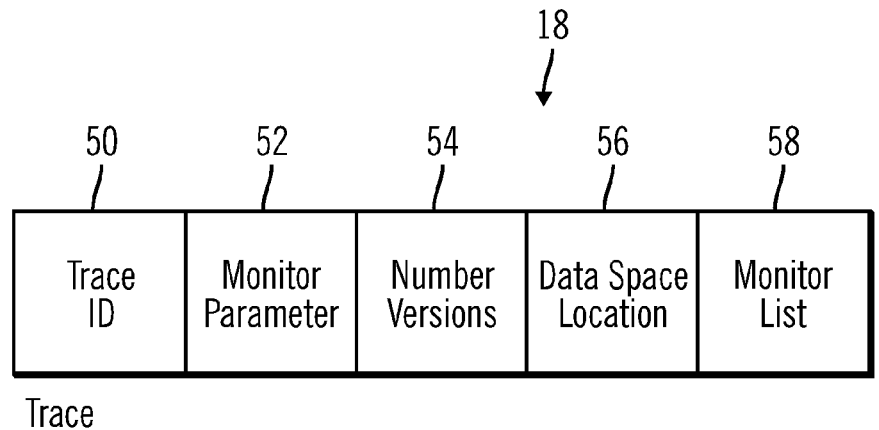
FIG. 2 illustrates an embodiment of a trace.

FIG. 2 illustrates an embodiment of a user defined trace 18 data structure, comprising one of the traces 18 shown in FIG. 1. A trace 18 data structure includes a trace identifier (ID) 50; a monitor parameter 52 used to determine the region of the application memory space 16 to monitor; a number of versions 54 of captured data from the application memory space 16 maintained in the trace data 20 in the data space 22; a data space location 56 in the data space 22 where the trace data 20 for the trace 50 is maintained; and a monitor list 56 indicating memory regions in the application memory space 16 to monitor when the monitor parameter 52 comprises an access type, such as a block size, application identifier, job identifier, etc., to monitor.

Figure 3:
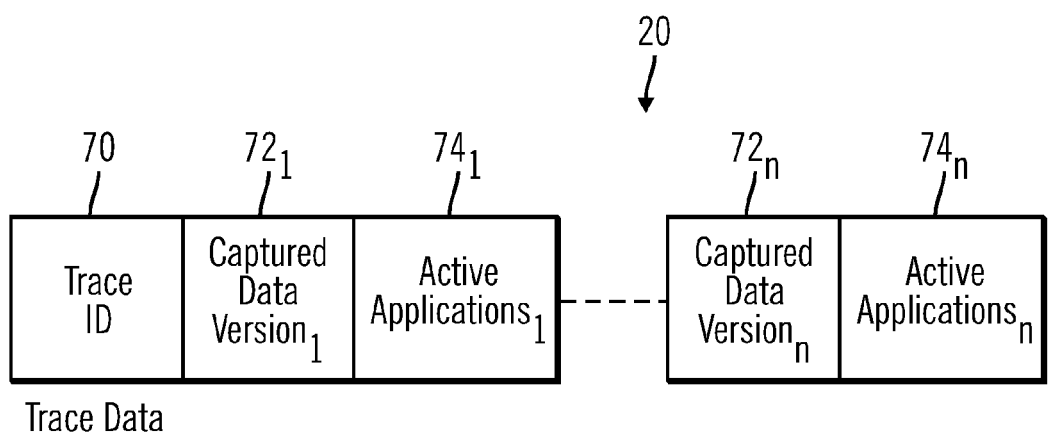
FIG. 3 illustrates an embodiment of trace data.

FIG. 3 illustrates an embodiment of trace data 20 stored in the data space 22 for one trace 18, comprising one of the instances of trace data shown in FIG. 1. A trace ID 70 identifies the trace 18 for which the captured data is stored and includes one or more versions of captured data $72_1 \ldots 72_n$ from a region of the memory space. For each version, the trace data 20 may further store a list of active applications $74_1 \ldots 74_n$ indicating applications and jobs active when the corresponding captured data $72_1 \ldots 72_n$ was captured by the trace procedure 14 performing the trace 70. The versions of the captured data $72_1 \ldots 72_n$ may consist of a base version $72_1$ or full copy having all the captured data in the monitored memory region followed by incremental versions $72_2 \ldots 72_n$ indicating changes to the monitored memory region since a previous version (incremental copy) or since the first full copy version $72_1$ (differential copy). Alternatively, the captured data $72_2 \ldots 72_n$ following the base version $72_1$ may comprise full copies of the monitored memory region 16 being captured.

Figure 4:
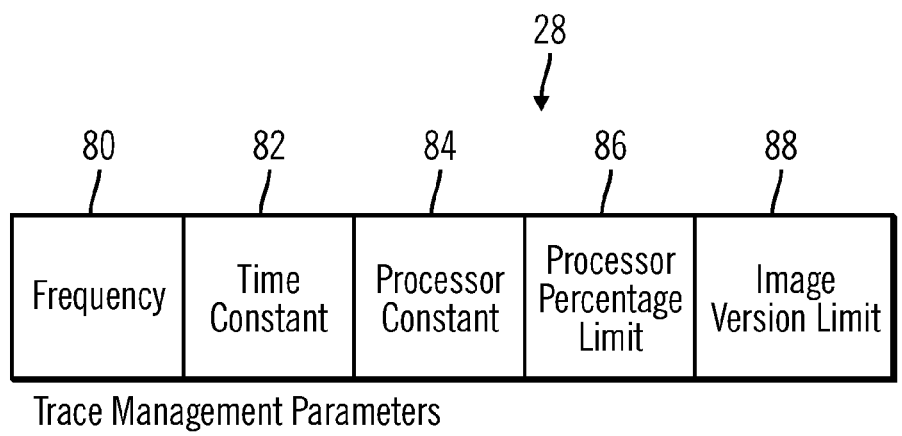
FIG. 4 illustrates an embodiment of trace management parameters.

FIG. 4 illustrates an embodiment of trace manager parameters 28, such as shown in FIG. 1, used by the trace manager 12 and trace procedures 14 to manage trace operations. A frequency 80 indicates a time interval at which the trace procedures 14 capture data from the application memory space 16; a time constant 82 indicates a time value used to calculate the frequency 80; a processor constant 84 comprises another value used to calculate the frequency that takes into account the total amount of CPU cycles available in the processor 4; and a processor percentage limit 86 indicating a percentage of processor resources to devote to trace operations, such as the procedures 14 and/or trace manager 12. The processor percentage limit 86 is used such that the frequency 80 is increased when the limit 86 is exceeded to reduce the amount of processor resources devoted to trace operations. The processor constant 84 may be used to increase or decrease the frequency depending on the resources or specification of the processor 4. For instance, a more powerful processor 4 will have a lower constant to increase by a lower amount the frequency or interval at which trace procedure 14 operations are performed and a higher constant 84 to increase by a greater amount the frequency 80 at which the trace procedure 14 operations are performed. The time constant 82, processor constant 84, and processor percentage limit 86 may be set by a user or administrator of the host 6 that is creating traces 18 to monitor the application memory space 16 or comprise default values.

The frequency 80 may be determined as a function of the time constant 82, the processor constant 84 and size of the memory regions being monitored by active trace procedures 14. The memory regions being monitored by active trace procedures 14 may include address ranges indicated in monitor parameters 52 of traces 18 specifying a specific address range of the application memory space 16 and address ranges indicated in monitor lists 58 of traces 18 that monitor for access types.

The trace management parameters 28 may further indicate a user defined image version limit 88 indicating a maximum number of versions of captured data $72_1 \ldots 72_n$ that may be maintained in the data space 22 for each trace 18.

The variable n indicating a number of an element, e.g., $72_n$, $74_n$, may comprise any positive integer value to denote a specific number of instances of an element.

Further, the variable n_when used with different elements, e.g., $72_n$, $74_n$, may indicate a same or different number of elements.

A user may define traces 18 to monitor regions of the application memory space 16 if there are detected problems. For instance, if a memory overlay or data integrity problem has been detected, the user may define a trace 18 with a monitor parameter 52 indicating an address range in the memory space 16 experiencing problems or an application ID of an application experiencing problems to monitor all memory regions accessed by the specified application 10. Further, the user may specify a block size to monitor memory regions 16 accessed according to the monitored block size if errors have been detected for a specific block size. With described embodiments, the user may set multiple traces 18 to monitor for different problems, e.g., applications, jobs, block sizes, and different memory regions at the same time. In this way, multiple trace procedures 14 may be concurrently executing at the calculated frequency 80 to capture data in different regions of the application memory space 16 to store as versions of captured data $72_1 \ldots 72_n$ in the trace data 20 for the different defined traces 18.

The trace data 20 for different traces 18 may be stored in a specific location in one data space 22 allocated to the trace 18 or stored in separate data spaces maintained for the traces.

The trace manager 12 may further implement a user interface (e.g., graphical user interface (GUI), command console, etc.) providing commands and controls to allow a user to create settings for a new trace 18, add and delete existing traces 18, and activate and deactivate traces 18. A deactivated trace 18 is a trace that exists in the traces 18, but there is no trace procedure 14 operating to perform the trace operations defined by the deactivated trace 18. An activated trace 18 is a trace for which a trace procedure 14 is currently running to perform trace operations.

The trace data 20 may be used and accessed by an administrator to determine the source of errors that are occurring in the application memory space 16, such as overlaying errors, etc.

Figure 5:
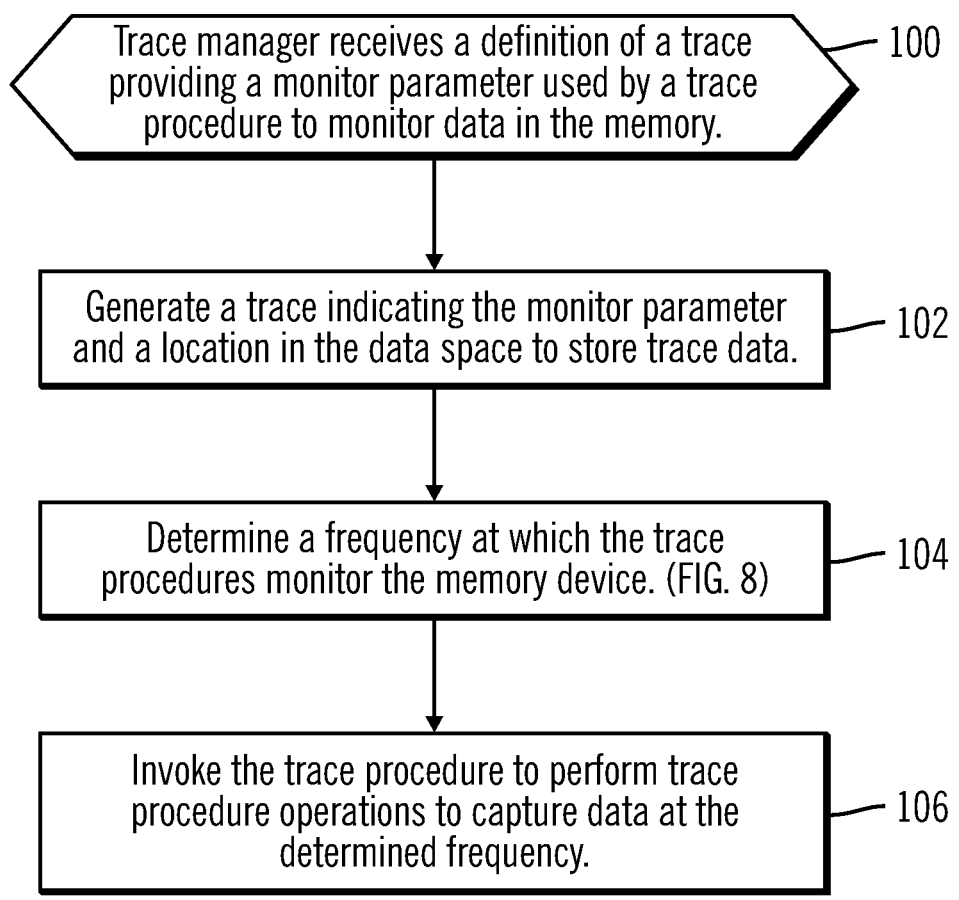
FIG. 5 illustrates an embodiment of operations to process a trace definition.

FIG. 5 illustrates an embodiment of operations performed by the trace manager 12 to manage traces 18. Upon receiving (at block 100) a definition of a trace 18 providing a monitor parameter 52, the trace manager 12 generates (at block 102) a trace 18 data structure indicating the received monitor parameter 52 and a location in the data space 22 to store trace data 20 for the newly defined or modified trace 18. The received definition may be for a new trace 18 or may comprise a modification of an existing trace 18. The trace manager 12 determines (at block 104) a frequency 80 at which the trace procedure 14 is invoked to capture data, which may be defined in the management parameters 28. The trace manager 12 invokes (at block 106) a trace procedure 14 to operate at the determined frequency to perform trace procedure operations, including capturing data. There may be multiple active trace procedures 14 executing concurrently to monitor different regions of the memory space 16 and monitor for different types of accesses to independently capture regions of the memory at the determined frequency 80 to store as trace data 20 in the data space 22.

Figure 6:
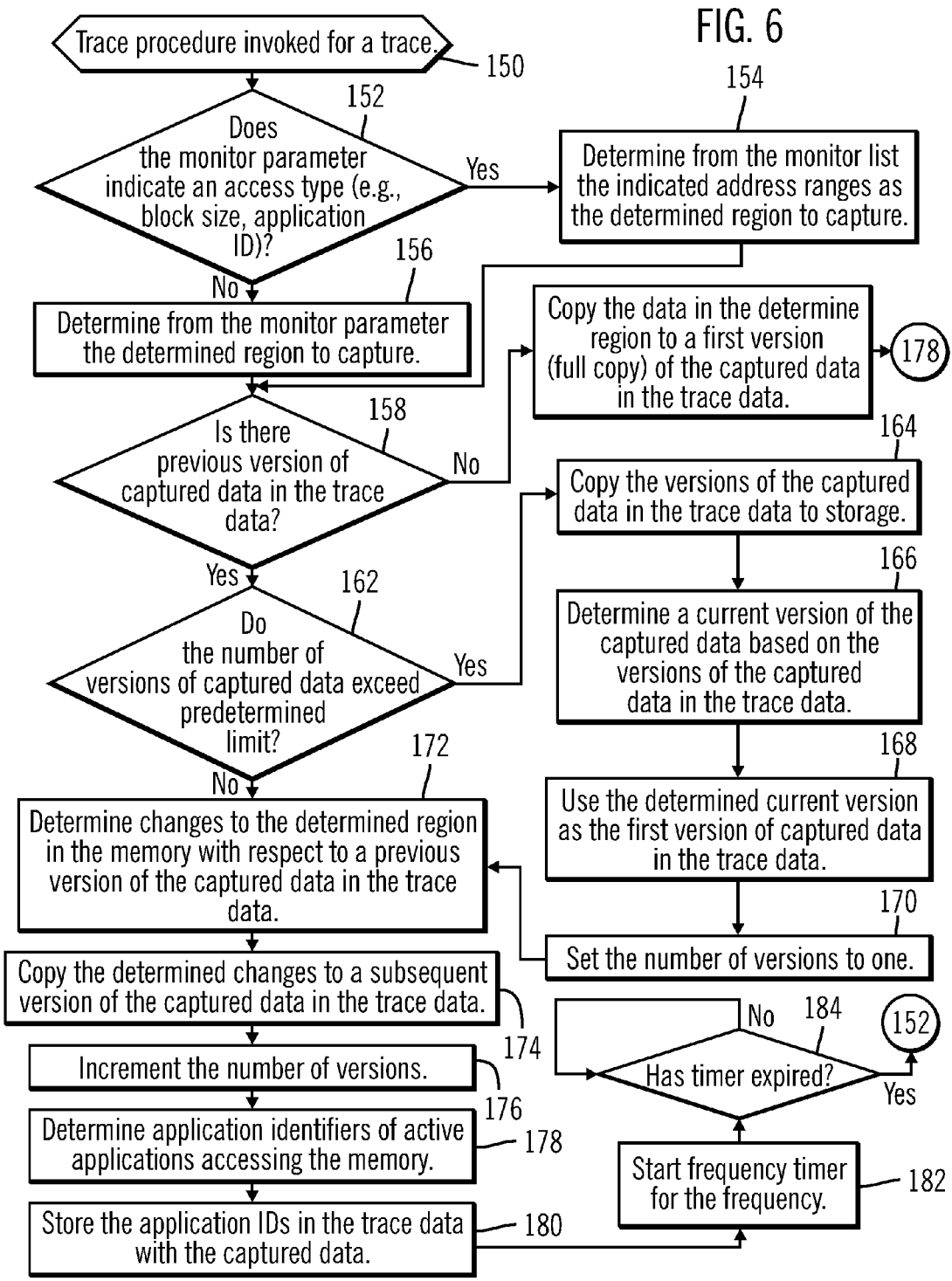
FIG. 6 illustrates an embodiment of operations performed by a trace procedure invoked for a trace.

FIG. 6 illustrates an embodiment of operations performed by the trace procedures 14 to execute a defined trace 18. Upon being invoked (at block 150) by the trace manager 12, the trace procedure 14 performs operations to determine the region of the application memory space 16 to capture by determining (at block 152) whether the monitor parameter 52 in the trace being invoked indicates an access type, such as to monitor for access of a block size or access from an application. If (at block 152) the monitor parameter 52 is for an access type, then the trace procedure 14 determines (at block 154) from the monitor list 58 the indicated address ranges accessed by the access type and uses those indicated address ranges as the determined memory region to capture. If the monitor parameter 52 is not for an access type, but instead indicates an address range of the application memory space 16 to monitor, then the trace procedure 14 determines (at block 156) the memory region to capture from the monitor parameter 52. For monitor parameters 52 specifying the access type, the trace procedure 14 may delay a first time of data capture to monitor for memory regions accessed according to the specified access type.

If (at block 158) there is no previous version of captured data $72_1 \ldots 72_n$, then the trace procedure 14 copies (at block 160) all the data in the determined memory region to a first version of the captured data $72_1$, e.g., full copy, in the trace data 20 in the data space 22. Control then proceeds to block 178 to capture information on active applications accessing the memory 16 and perform an additional capture iteration of operations according to the determined frequency 80. If (at block 158) there are one or more previous versions of captured data $72_1 \ldots 72_n$, then the trace procedure 14 determines (at block 162) whether the number of versions 54 exceeds a version limit 88. If so, then the trace procedure 14 copies (at block 164) the trace data 20 in the data space 20, including versions of captured data $72_1 \ldots 72_n$ and active applications $74_1 \ldots 74_n$ for the versions, to the storage 24.

The trace procedure 14 determines (at block 166) a current version of the captured data based on the versions $72_1 \ldots 72_n$ in the data space. For instance, if the subsequent versions $72_2 \ldots 72_n$ are incremental, then they may be merged into the base version $72_1$ to obtain the current version of the captured data from the monitored region, if differential, the most recent version $72_n$ is combined with the base version $72_1$ to obtain the current version. The determined current version of the captured data based on the versions in the trace data 20 is used (at block 168) as the first version of captured data $72_1$ in the trace data 20 and the number of versions 54 indicated in the trace 18 is set (at block 170) to one. In certain embodiments, the monitor list 58 may be cleared for the next versions of captured data to generate. Alternatively, the monitor list 58 may not be cleared to continually maintain information on the memory addresses accessed by the monitored access type during the existence of the trace 18 throughout different sets of versions of captured data.

If (at block 162) the number of versions 54 does not exceed the version limit 88 or after clearing versions after the version limit 88 is reached (from block 170), the trace procedure 14 determines (at block 172) changes to the determined region in the memory 16 with respect to the previous versions of the captured data $72_1 \ldots 72_n$. The determined changes are copied (at block 174) to a subsequent version of the captured data $72_n$ in the trace data 20 and the number of versions 54 is incremented (at block 176). The trace procedure 14 determines (at block 178) application identifiers of active applications 10 accessing the application memory space 16. The determined application IDs are stored (at block 180) in a version of active applications $74_n$ in the trace data 20 for the corresponding version of captured data $72_n$. After updating the trace data 20, a frequency timer having a duration of the frequency 80 is started (at block 182) and, after the timer expires (at block 184), control proceeds back to block 152 for another iteration of capturing data.

The operations of the trace procedure 14 of FIG. 6 may be terminated in response to a user deactivating the trace procedure. The operations of the trace procedure 14 of FIG. 6 may be invoked in response to a user activating a previously deactivated trace 18, creating a new trace 18 or modifying an exiting trace 18.

Figure 7:
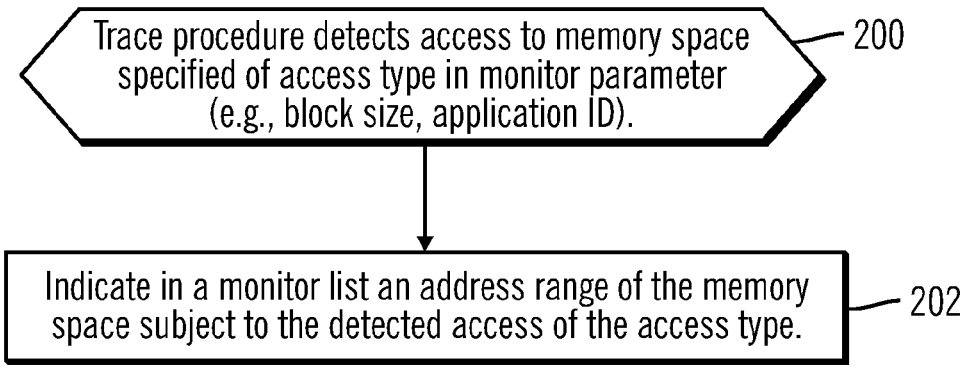
FIG. 7 illustrates an embodiment of operations performed by a trace procedure detecting an access of a monitored access type.

FIG. 7 illustrates an embodiment of operations performed by a trace procedure 14 for a trace 18 that specifies an access type, e.g., block size, application ID, for the monitor parameter 52. Upon detecting (at block 200) an access to the memory space 16 of the type specified in the monitor parameter 52, e.g., an access to a specified blocks size, an access from a specified application or job, the trace procedure 14 indicates (at block 202) in the monitor list 58 for the trace 18 an address range of the application memory space 16 subject to the detected access of the monitored access type.

Figure 8:
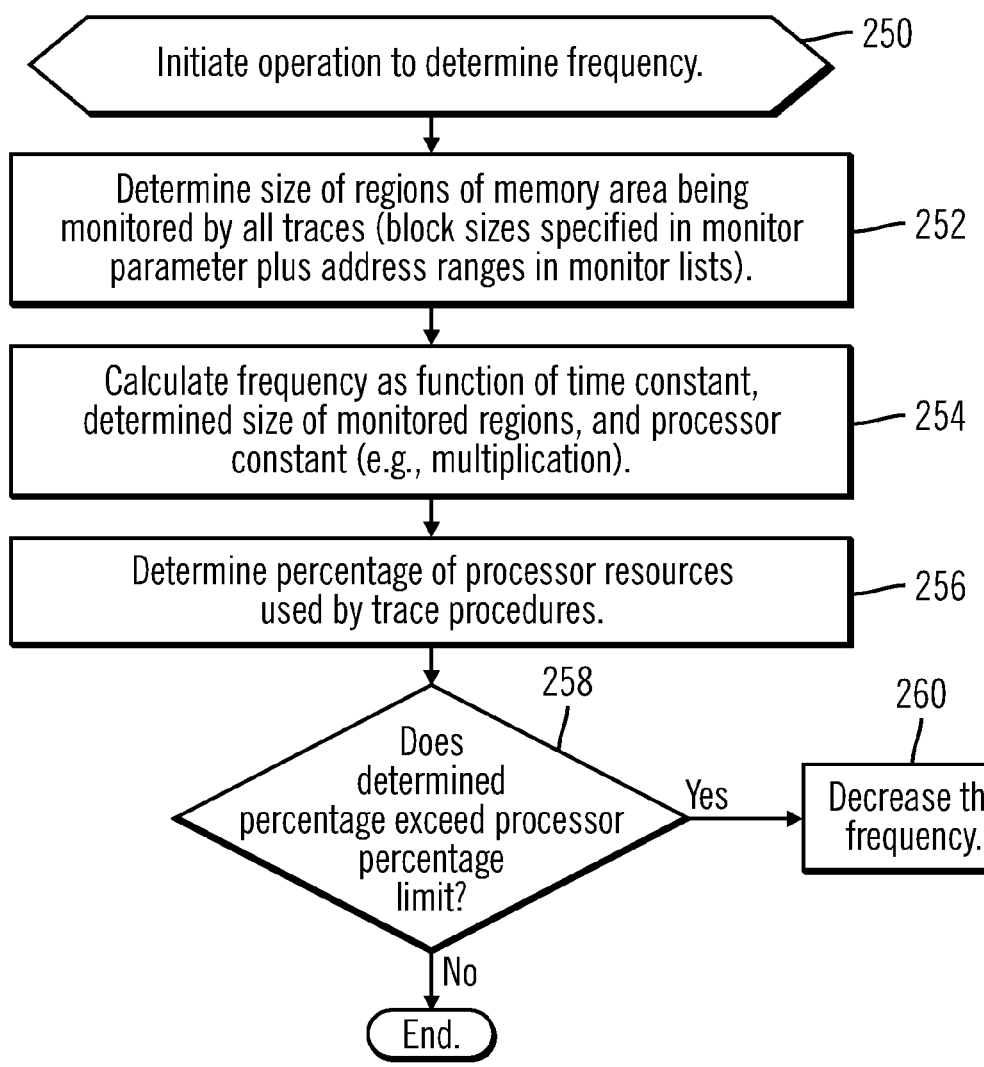
FIG. 8 illustrates an embodiment of operations to determine a frequency at which trace procedures capture data.

FIG. 8 illustrates an embodiment of operations performed by the trace manager 12 to set the frequency 80 that determines the frequency at which trace procedures 14 perform monitoring operations, such as at step 104 in FIG. 5. The trace manager 12 may periodically recalculate the frequency or perform the frequency determination in response to an event, such as receiving a new trace 18 definition, detecting change in available processor resources, etc. Upon initiating (at block 250) the operation to determine the frequency 80, the trace manager 12 determines a size, e.g., block size, byte size, etc., of regions of memory areas being monitored by all active traces 18. The determined size may comprise the size of memory ranges specified in monitor parameters 52 to monitor plus the size of memory ranges indicated in the monitor lists 58 of all traces 18 having an access type monitor parameter 52. In this way, the determined size comprises the size of all memory addresses being monitored by trace procedures 14 and for which data has been or will be captured. The trace manager 12 calculates the frequency 80 as a function of an initial time constant 82, the determined size of monitored regions, and a processor constant 84 comprising a value related to the performance specifications of the processor 4. The function may comprise multiplication or some other functions. In certain embodiments, the processor constant 84 is inverse with respect to the performance capabilities of the processor 4, such that a lower processor constant 84 decreases the frequency 80 to allow the trace procedures 14 to operate more frequently, which is more suited for a higher performance processor 4. A higher processor constant 84 may increase the frequency 80 to reduce the frequency at which the trace procedures 14 operate, which is suitable for processors 4 having lower performance characteristics.

The trace manager 12 may further determine (at block 256) a percentage of processor 4 resources currently dedicated to trace procedures 14 and the trace manager 12. If (at block 258) this determined percentage exceeds a processor percentage limit 86, indicating a maximum amount of processor 4 resources to allocate to trace procedures 14, then the frequency is decreased (at block 260). If (at block 258) the determined percentage does not exceed the processor percentage limit 86, then control ends. In certain embodiments, the frequency may be decreased at block 260 by a set percentage or the decrease may be calculated based an extent to which the determined percentage exceeds the processor percentage limit 86.

Described embodiments provide techniques to create traces to monitor regions of a memory space based on different monitor parameters, such as a specified memory address range to monitor a type of access to monitor, e.g., block size, application. Further, with described embodiments, multiple traces may be concurrently active to allow concurrent different types of monitoring against the memory space. This allows users to set different traces to monitor for different types of problems that have been occurring to troubleshoot errors occurring in a certain memory region, for a certain block size or certain applications. The user may set traces after errors have occurred to capture data in memory regions. Then after the traces have been set, when the error is further detected, the user may debug the error by accessing the captured data in the trace data to determine the content of the memory regions affected by the error when the error occurred.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program for capturing data stored in a memory device, the computer program product comprising a computer readable storage medium having computer readable program code embodied therein that executes to perform operations, the operations comprising:
   receiving settings for a plurality of traces each including a monitor parameter used by a trace procedure to monitor data in the memory device; and
   for each of the traces, performing:
      determining a frequency at which the trace procedure monitors the memory device; and
      invoking a trace procedure at the determined frequency to perform trace procedure operations comprising:
         determining a region in the memory device according to the monitor parameter; and
         copying data in the determined region to trace data in a data space,
   wherein the invoked trace procedures operate concurrently for multiple active traces to capture data in different regions of the memory device.

2. The computer program product of claim 1, wherein the operations further comprise:
   providing commands to allow a user to create settings for a new trace;
   providing commands to allow a user to add and delete traces; and
   providing commands to allow a user to activate or deactivate traces.

3. The computer program product of claim 1, wherein the monitor parameter specifies an address region of the memory device, and wherein the determined region comprises the address region specified in the monitor parameter.

4. The computer program product of claim 1, wherein copying the data in the determined region to the trace data in the data space further comprises:
   for a first invoked trace procedure, copying all data in the determined region of the memory device to a first version of captured data in the trace data;
   for each subsequent invoked trace procedure performed following the first invoked trace procedure, performing:
      determining changes to the determined region in the memory device with respect to a previous version of at least one captured data version in the data space; and
      copying the determined changes to a subsequent version of the captured data in the data space.

5. The computer program product of claim 4, wherein the data space stores captured data for a predetermined number of versions, wherein the operations further comprise:
   in response to determining that the data space includes the predetermined number of versions of the captured data, performing:
      determining a current version of the captured data based on the first and subsequent versions of the captured data; and
      using the determined current version as the first version of the captured data in the trace data; and
      invoking the trace procedure at the determined frequency to copy changes to the determined region to subsequent versions of the captured data with respect to the first version of the trace data.

6. The computer program product of claim 5, wherein the operations further comprise:
   copying the versions of the captured data in the trace data for the monitored memory device to a storage in response to determining that the trace data includes the predetermined number of versions of the captured data.

7. The computer program product of claim 1, wherein the determined frequency is calculated as a function of a time constant and at least one of a size of the determined region being monitored and a processor constant based on processor specifications.

8. The computer program product of claim 1, wherein the operations further comprise:
  determining that an amount of processor resources used to execute the trace procedure exceeds a predetermined limit; and
  decrease the frequency at which the trace procedure is invoked to monitor the memory device in response to determining that the amount of processor resources for the trace procedure exceeds the predetermined limit.

9. The computer program product of claim 1, wherein the trace procedure further performs operations comprising:
  determining application identifiers of active applications accessing the memory device; and
  storing in the trace data a list of the determined application identifiers.

10. A computer program for capturing data stored in a memory device, the computer program product comprising a computer readable storage medium having computer readable program code embodied therein that executes to perform operations, the operations comprising:
  receiving a setting of a trace including a monitor parameter used by a trace procedure to monitor data in the memory device, wherein the monitor parameter specifies an access type;
  determining a frequency at which the trace procedure monitors the memory device; and
  invoking the trace procedure at the determined frequency to perform trace procedure operations comprising:
    determining a region in the memory device according to the monitor parameter;
    copying data in the determined region to trace data in a data space;
    detecting an access to the memory device of the access type; and
    indicating in a monitor list an address range of the memory device subject to the detected access of the access type, wherein the determined region comprises each address range indicated in the monitor list.

11. The computer program product of claim 10, wherein the access type indicates at least one of:
  an application identifier, wherein the access is detected in response to an application having the indicated application identifier accessing the memory device; and
  a block size, wherein the access is detected in response to an access to the memory device of the indicated block size.

12. A system, comprising:
a processor;
a memory device in data communication with the processor;
a computer program in the memory device executed by the processor to perform operations, the operations comprising:
  receiving settings for a plurality of traces each including a monitor parameter used by a trace procedure to monitor data in the memory device; and
  for each of the traces, performing:
    determining a frequency at which the trace procedure monitors the memory device; and
    invoking a trace procedure at the determined frequency to perform trace procedure operations comprising:
      determining a region in the memory device according to the monitor parameter; and
      copying data in the determined region to trace data in a data space,
  wherein the invoked trace procedures operate concurrently for multiple active traces to capture data in different regions of the memory device.

13. The system of claim 12, wherein copying the data in the determined region to the trace data in the data space further comprises:
  for a first invoked trace procedure, copying all data in the determined region of the memory device to a first version of captured data in the trace data;
  for each subsequent invoked trace procedure performed following the first invoked trace procedure, performing:
    determining changes to the determined region in the memory device with respect to a previous version of at least one captured data version in the data space; and
    copying the determined changes to a subsequent version of the captured data in the data space.

14. The system of claim 12, wherein the determined frequency is calculated as a function of a time constant and at least one of a size of the determined region being monitored and a processor constant based on processor specifications.

15. The system of claim 12, wherein the operations further comprise:
  determining that an amount of processor resources used to execute the trace procedure exceeds a predetermined limit; and
  decrease the frequency at which the trace procedure is invoked to monitor the memory device in response to determining that the amount of processor resources for the trace procedure exceeds the predetermined limit.

16. The system of claim 12, wherein the trace procedure further performs operations comprising:
  determining application identifiers of active applications accessing the memory device; and
  storing in the trace data a list of the determined application identifiers.

17. A system, comprising:
a processor;
a memory device in data communication with the processor; and
a computer program in the memory device executed by the processor to perform operations, the operations comprising:
  receiving a setting of a trace including a monitor parameter used by a trace procedure to monitor data in the memory device, wherein the monitor parameter specifies an access type;
  determining a frequency at which the trace procedure monitors the memory device; and
  invoking the trace procedure at the determined frequency to perform trace procedure operations comprising:
    determining a region in the memory device according to the monitor parameter;
    copying data in the determined region to trace data in a data space;
    detecting an access to the memory device of the access type; and
    indicating in a monitor list an address range of the memory device subject to the detected access of the access type, wherein the determined region comprises each address range indicated in the monitor list.

18. The system of claim 17, wherein the access type indicates at least one of:
  an application identifier, wherein the access is detected in response to an application having the indicated application identifier accessing the memory device; and
  a block size, wherein the access is detected in response to an access to the memory device of the indicated block size.

19. A method, comprising:
  receiving settings for a plurality of traces each including a monitor parameter used by a trace procedure to monitor data in a memory device; and
  for each of the traces, performing:
    determining a frequency at which the trace procedure monitors the memory device; and
    invoking the trace procedure at the determined frequency to perform trace procedure operations comprising:
      determining a region in the memory device according to the monitor parameter; and
      copying data in the determined region to trace data in a data space,
  wherein the invoked trace procedures operate concurrently for multiple active traces to capture data in different regions of the memory device.

20. The method of claim 19, wherein copying the data in the determined region to the trace data in the data space further comprises:
  for a first invoked trace procedure, copying all data in the determined region of the memory device to a first version of captured data in the trace data;
  for each subsequent invoked trace procedure performed following the first invoked trace procedure, performing:
    determining changes to the determined region in the memory device with respect to a previous version of at least one captured data version in the data space; and
    copying the determined changes to a subsequent version of the captured data in the data space.

21. The method of claim 19, wherein the determined frequency is calculated as a function of a time constant and at least one of a size of the determined region being monitored and a processor constant based on processor specifications.

22. The method of claim 19, wherein the operations further comprise:
  determining that an amount of processor resources used to execute the trace procedure exceeds a predetermined limit; and
  decrease the frequency at which the trace procedure is invoked to monitor the memory device in response to determining that the amount of processor resources for the trace procedure exceeds the predetermined limit.

23. The method of claim 19, wherein the trace procedure further performs operations comprising:
  determining application identifiers of active applications accessing the memory device; and
  storing in the trace data a list of the determined application identifiers.

24. A method, comprising:
  receiving a setting of a trace including a monitor parameter used by a trace procedure to monitor data in the memory device, wherein the monitor parameter specifies an access type;
  determining a frequency at which the trace procedure monitors the memory device; and
  invoking the trace procedure at the determined frequency to perform trace procedure operations comprising:
    determining a region in the memory device according to the monitor parameter;
    copying data in the determined region to trace data in a data space;
    detecting an access to the memory device of the access type; and
    indicating in a monitor list an address range of the memory device subject to the detected access of the access type, wherein the determined region comprises each address range indicated in the monitor list.

25. The method of claim 24, wherein the access type indicates at least one of:
  an application identifier, wherein the access is detected in response to an application having the indicated application identifier accessing the memory device; and
  a block size, wherein the access is detected in response to an access to the memory device of the indicated block size.

\* \* \* \* \*